: US007966016B2

(12) United States Patent
Moritomo

(10) Patent No.: US 7,966,016 B2
(45) Date of Patent: Jun. 21, 2011

(54) COMMUNICATION APPARATUS AND COMMUNICATION METHOD

(75) Inventor: Kazuo Moritomo, Kawasaki (JP)

(73) Assignee: Canon Kabushiki kaisha, Tokyo (JP)

( * ) Notice: Subject to any disclaimer, the term of this patent is extended or adjusted under 35 U.S.C. 154(b) by 438 days.

(21) Appl. No.: 11/555,533

(22) Filed: Nov. 1, 2006

(65) Prior Publication Data

US 2007/0115858 A1 May 24, 2007

(30) Foreign Application Priority Data

Nov. 21, 2005 (JP) ................................. 2005-336005

(51) Int. Cl.
*H04W 36/00* (2009.01)
*H04L 12/28* (2006.01)
*H04L 12/413* (2006.01)
(52) U.S. Cl. .................... 455/436; 370/254; 370/445
(58) Field of Classification Search ............... 370/445, 370/254; 445/436; 455/436
See application file for complete search history.

(56) References Cited

U.S. PATENT DOCUMENTS 5,448,721 A * 9/1995 Kaneko ......... 714/712
2005/0086465 A1 4/2005 Sapkota et al.
2005/0148326 A1* 7/2005 Nogawa et al. ............ 455/420
2005/0190919 A1* 9/2005 Baer et al. .................. 380/270
2005/0210242 A1* 9/2005 Troxel et al. ................ 713/160
2005/0286480 A1 12/2005 Akiyama
2006/0025136 A1* 2/2006 Fujita et al. ................. 455/436

FOREIGN PATENT DOCUMENTS

| JP | 2006-013788 A | 1/2006 |
| WO | 2005/091566 A1 | 9/2005 |

OTHER PUBLICATIONS

Altunbasak H et al: "Alternative Pair-wise Key Exchange Protocols for Robust Security Networks (IEEE 802.11i) in Wireless LANs" Southeastcon, 2004. Proceedings. IEEE Greensboro, North Carolina, USA, Piscataway, NJ, USA, IEEE, 2004, pp. 77-83, XP010697814 ISBN: 0-7803-8368-0 p. 3, right-hand column, section 2, p. 8, right-hand column, section 5.

* cited by examiner

*Primary Examiner* — Pierre-Louis Desir
*Assistant Examiner* — Timothy Pham
(74) *Attorney, Agent, or Firm* — Canon USA Inc. IP Division

(57) ABSTRACT

To reduce the processing load and maintain higher security in the communications, a communication apparatus includes a network surveying unit configured to determine at least one of (1) an architecture of a network comprising the communication apparatus, and (2) the number of apparatuses on the network; and an alteration detecting unit configured to perform alteration detection processing on data packets received by the communication apparatus, the processing being based on the determination by the network surveying unit.

17 Claims, 11 Drawing Sheets

FIG. 5

| WIRELESS COMMUNICATION ITEMS | DETAILED DATA |
|---|---|
| Network Mode | Ad-hoc |
| SSID | adhoc_dsc_printer |
| CH Number | 7 |
| Authentication Type | – |
| Encryption Type | CCMP |
| Encryption Key | dsctoprinter |
| NETWORK DEVICE NUMBER | 2 DEVICES |

COMMUNICATION APPARATUS AND COMMUNICATION METHOD

BACKGROUND OF THE INVENTION

1. Field of the Invention

The present invention relates to a security technique employable in communications.

2. Description of the Related Art

In wireless communications, encryption techniques are preferably used to avoid any wire tapping. Various encryption methods, such as for example WEP (Wire Equivalent Privacy), TKIP (Temporal Key Integrity Protocol), and AES (Advanced Encryption Standard), can be used in wireless LAN communications performed according to the IEEE802.11 standard.

Also, Counter mode with Cipher-Block Chaining-Message Authentication Code Protocol (also known as CCMP) is usable to detect alteration (for example falsification) of AES data according to the IEEE802.11i standard.

According to the CCMP, a wireless communication device can encrypt transmission data using a packet number which is incremented for each packet. Other communication devices can decrypt a received packet with reference to the packet number used in the encryption of the data, and can detect alterations present in the received encrypted data.

An infrastructure mode and an ad-hoc mode are two communication modes provided by the IEEE802.11 standard. In the infrastructure mode, wireless communication devices can communicate with each other via an access point (AP). In the ad-hoc mode, the wireless communication devices can directly communicate without using the AP.

As described above, the encryption processing according to the CCMP is performed based on the packet number. Therefore, the encryption key is differentiated for each packet.

In the infrastructure mode, the AP has a function of administrating the packet number of each wireless communication device in the network to establish data communications between the devices. Each wireless communication device is only required to administrate the packet number related to the MAC (Media Access Control) address of the AP, because no direct communication is performed between the wireless communication devices.

However, the AP is not present in the ad-hoc mode. Each wireless communication device is required to discriminate all other wireless communication devices in the network, and administrate all packet numbers related to these devices. As a result, a heavy burden is thus placed on each wireless communication device due to the complicated processing.

SUMMARY OF THE INVENTION

Embodiments of the present invention are directed to a technique capable of overcoming or at least mitigating the above-described problems.

According to an aspect of the present invention, at least one exemplary embodiment is directed to a technique capable of reducing the processing load in the communications and maintaining higher security.

According to another aspect of the present invention, a communication apparatus includes a network surveying unit configured to determine at least one of (1) an architecture of a network comprising the communication apparatus, and (2) the number of apparatuses on the network; and an alteration detecting unit configured to perform alteration detection processing on data packets received by the communication apparatus, the processing being based on the determination by the network surveying unit.

Furthermore, according to another aspect of the present invention, a method is provided which may be performed by a communication apparatus. While the method includes determining at least one of (1) an architecture of a network comprising the communication apparatus, and (2) the number of apparatuses on the network; and performing alteration detection processing on data packets received by the communication apparatus, wherein the processing is based on the determination.

Additionally, according to still yet another aspect of the present application, a computer readable medium is provided containing computer-executable instructions to be performed by a communication apparatus. Here, the medium includes computer-executable instructions for determining at least one of (1) an architecture of a comprising the communication apparatus, and (2) the number of apparatuses on the network; and computer-executable instructions for performing alteration detection processing on data packets received by the communication apparatus, wherein the processing is based on the determination.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing example wireless communication parameters in accordance with an exemplary embodiment.

DETAILED DESCRIPTION OF THE EMBODIMENTS

Figure 1:
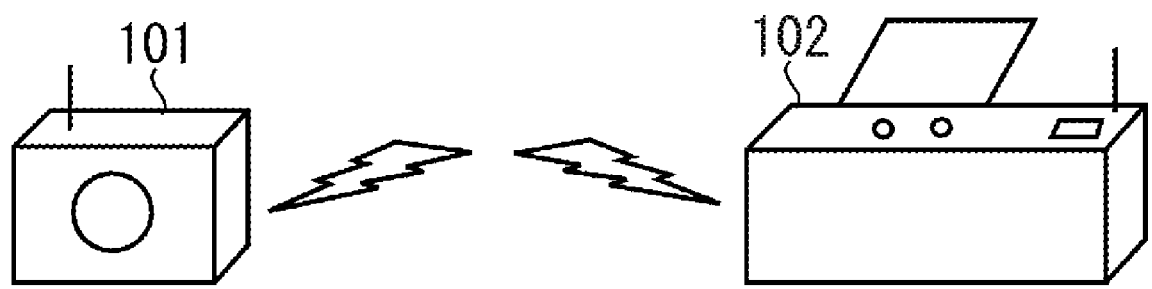
FIG. 1 is a schematic view illustrating an example wireless communication system including two wireless communication devices operable in the ad-hoc mode according to an aspect of the present invention.

The following description of exemplary embodiments is merely illustrative in nature and is in no way intended to limit the invention, its application, or uses. It is noted that throughout the specification, similar reference numerals and letters refer to similar items in the following figures, and thus once an item is defined in one figure, it may not be discussed for following figures. Exemplary embodiments will now herein be described in detail below with reference to the drawings.

Figure 9A:
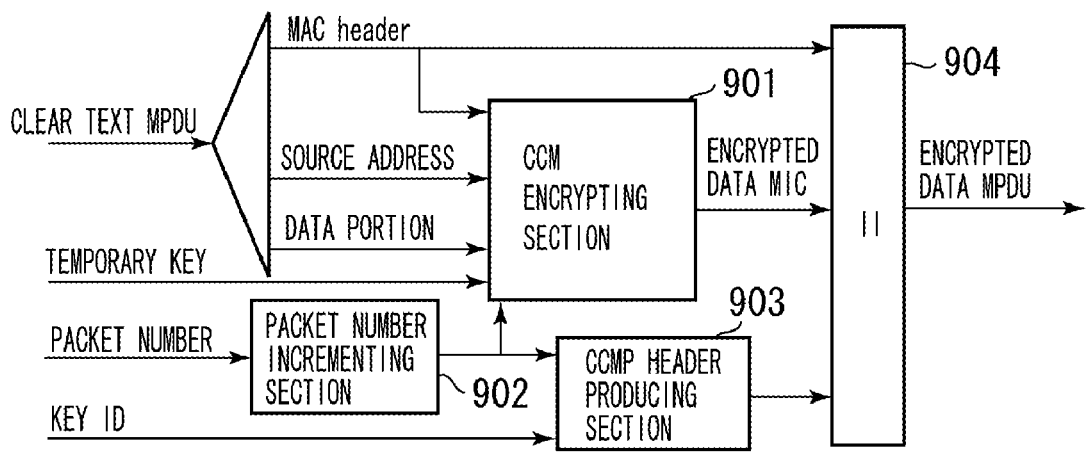
FIG. 9A is a block diagram illustrating an example CCMP encryption circuit in accordance with an exemplary embodiment.

First, a CCMP system will be described with reference to FIGS. 9A and 9B. FIG. 9A is a block diagram illustrating a circuit arrangement for performing encryption processing according to the CCMP system. A packet number incrementing section 902 can increment a packet number for each packet and can administrate the incremented packet number.

A CCM encrypting section 901 can encrypt a data portion of a clear text MPDU (i.e., MAC Protocol Data Unit) with reference to a MAC header involved in the entered clear text MPDU, a MAC header address (i.e., source address), a temporary key set by a user, and a packet number.

A CCMP header producing section 903 can produce a CCMP header with reference to encrypted data, MIC (i.e., Message Integrity Check) checking consistency of data, the MAC header extracted from the clear text, the packet number, and a Key ID designating a key number used in the encryption processing. An encrypted MPDU assembling section 904 can combine the above data to produce an encrypted MPDU.

Figure 9B:
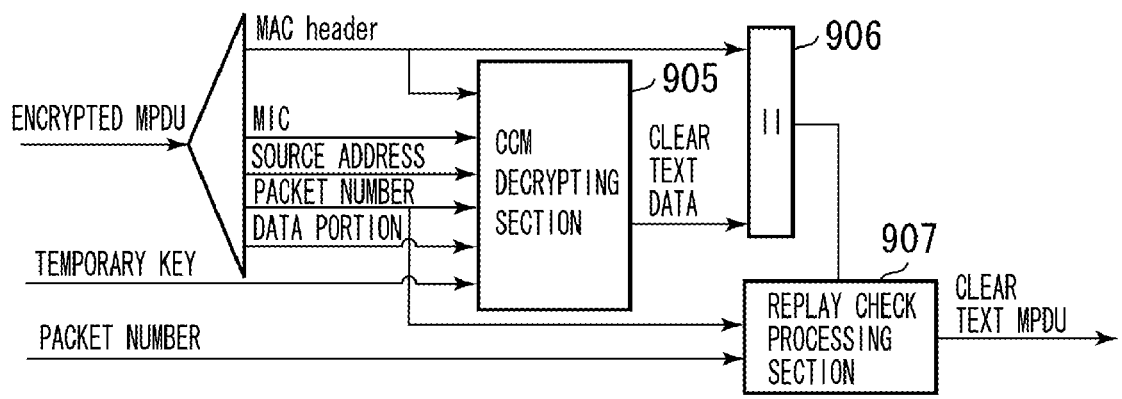
FIG. 9B is a block diagram illustrating an example CCMP decryption circuit in accordance with an exemplary embodiment.

FIG. 9B is a block diagram illustrating a circuit arrangement for performing decryption processing in the CCMP system. A CCMP decrypting section 905 can decrypt the encrypted data portion with reference to the MAC header of the received encrypted MPDU, MIC, MAC header address, the packet number, and the temporary key set by a user. A clear text MPDU assembling section 906 can assemble a clear text MPDU based on the MAC header extracted from the encrypted MPDU and the decrypted data portion. Each wireless communication device can administrate the MAC address of other wireless communication device in relation to the packet number.

A replay check processing section 907 can execute "Replay Check" processing. More specifically, the replay check processing section 907 compares a "packet number administrated by the communication device" with a "packet number of received encrypted MPDU." When the "packet number administrated by the device" is smaller than or equal to the "packet number of the received encrypted MPDU", the replay check processing section 907 decides that the received encrypted MPDU is normal data.

On the other hand, if the "packet number administrated by the device" is larger than the "packet number of the received encrypted MPDU", the replay check processing section 907 decides that the received encrypted MPDU has been altered.

FIG. 1 shows an example system arrangement including a camera, such as a digital still camera (hereinafter referred to as DSC) 101 and a printer 102 which can perform wireless communications in the ad-hoc mode defined by the IEEE802.11 standard. The DSC 101 can function as an image capturing apparatus, while the printer 102 can function as an image output apparatus. The DSC 101 and the printer 102 are configured to perform data encryption according to the CCMP system, and are also configured to perform data decryption and alteration detection according to the CCMP system.

Figure 2:
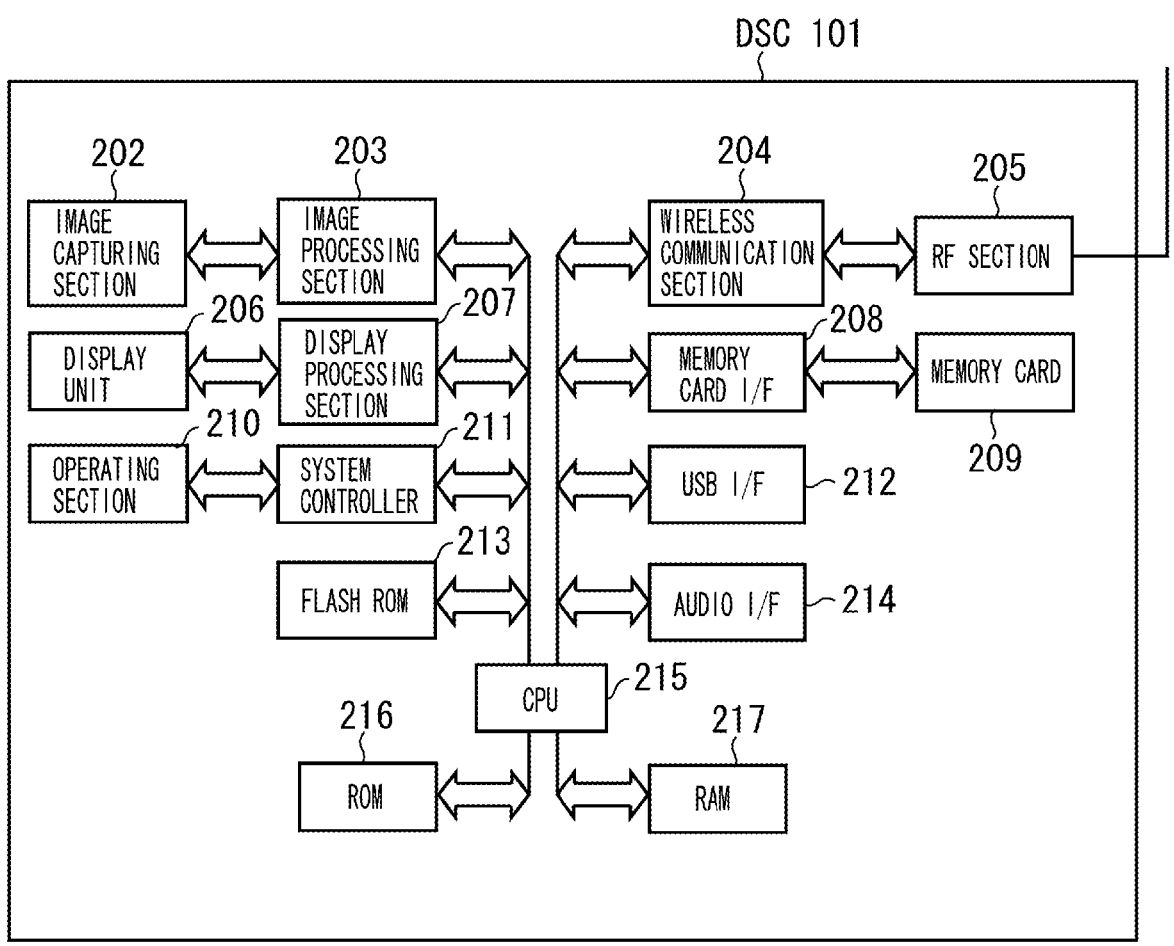
FIG. 2 is a block diagram illustrating an example functional arrangement of a digital camera in accordance with an exemplary embodiment.

FIG. 2 is a block diagram illustrating an example functional arrangement of the DSC 101 according to the exemplary embodiment. An operating section 210 is connected via a system controller 211 to a CPU 215. The operating section 210 includes a shutter switch and various keys of the DSC 101. An image capturing section 202 can capture an image when the shutter switch is pressed by a user. An image processing section 203 can process the image captured by the image capturing section 202. A display unit 206, such as LCD display, LED display, or sound display, can display various information and data.

A display processing section 207 can control display contents. A user can select desirable item(s) displayed on the display unit 206 by operating the operating section 210. In this respect, the display unit 206 and the operating section 210 cooperatively constitute a user interface (I/F) of the DSC 101. A wireless communication section 204 is capable of performing wireless communications.

An RF section 205 can control transmission/reception of a wireless signal between the DSC 101 and other wireless communication device. The wireless communication section 204 and the RF section 205 cooperatively constitute a wireless section of the DSC 101.

A memory card I/F 208 is an interface via which a memory card 209 is detachably connected to the CPU 215. A USB I/F 212 is an interface via which an external USB device can be connected to the CPU 215. An audio I/F 214 is an interface via which a sound signal can be transmitted to an external device. The CPU 215 can control the above-described functional sections as described later.

A ROM 216 or a flash ROM 213 can store various programs executable by the CPU 215. The data processed in the CPU 215 can be written into or read from a RAM 217 or a flash ROM 213. The flash ROM 213 is a nonvolatile storage medium that can store setting information relating to the wireless communications. The captured image data, after compression processing, can be written (stored) in the memory card 209 via the memory card I/F 208.

Figure 3:
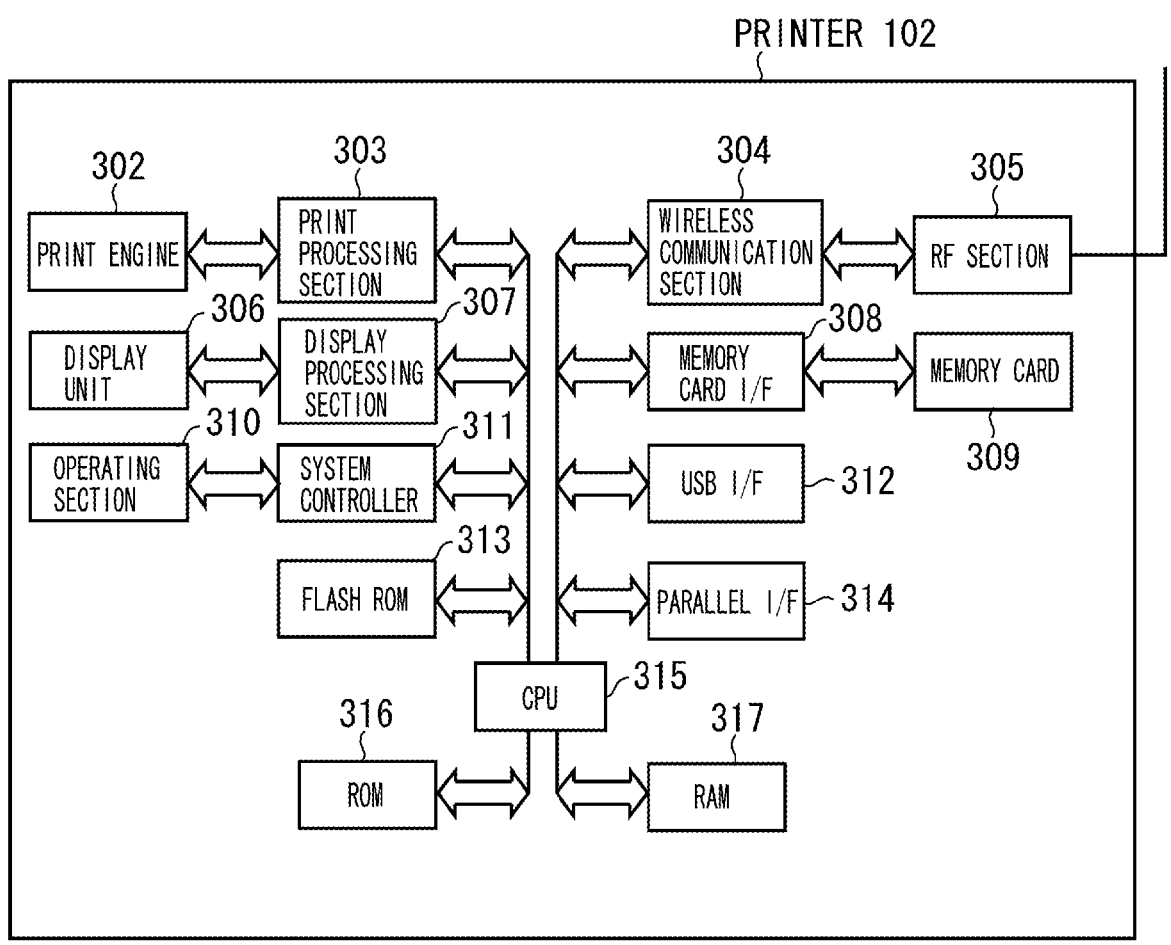
FIG. 3 is a block diagram illustrating an example functional arrangement of a printer in accordance with an exemplary embodiment.

FIG. 3 is a block diagram illustrating an example functional arrangement of a printer 102 according to the present exemplary embodiment. An operating section 310 is connected via a system controller 311 to a CPU 315. A print engine 302 can print an image on a paper. A print processing section 303 can process the image. A display unit 306, such as LCD display, LED display, or sound display, can display various information and data.

A display processing section 307 can control display contents. A user can select desirable item(s) displayed on the display unit 306 by operating the operating section 310. In this respect, the display unit 306 and the operating section 310 cooperatively constitute a user interface (I/F) of the printer 102.

The wireless communication section 304 is capable of performing wireless communications. An RF section 305 can control transmission/reception of a wireless signal between the printer 102 and other wireless communication device. The wireless communication section 304 and the RF section 305 cooperatively constitute a wireless section of the printer 102.

A memory card I/F 308 is an interface via which a memory card 309 is detachably connected to the CPU 315. When the memory card 209 of the DSC 101 is connected to the memory card I/F 308 of the printer 102, the print engine 302 can print an image captured by the DSC 101. A USB I/F 312 is an interface via which an external USB device can be connected to the CPU 315.

A parallel I/F 314 is an interface via which the CPU 315 can perform parallel communications with an external device (such as a host computer). The CPU 315 can control the above-described functional sections as described later. A ROM 316 or a flash ROM 313 can store various programs executable by the CPU 315. The data processed in the CPU 315 can be written into or read from a RAM 317 or a flash ROM 313. The flash ROM 313 is a nonvolatile storage medium that can store setting information relating to the wireless communications.

Figure 4:
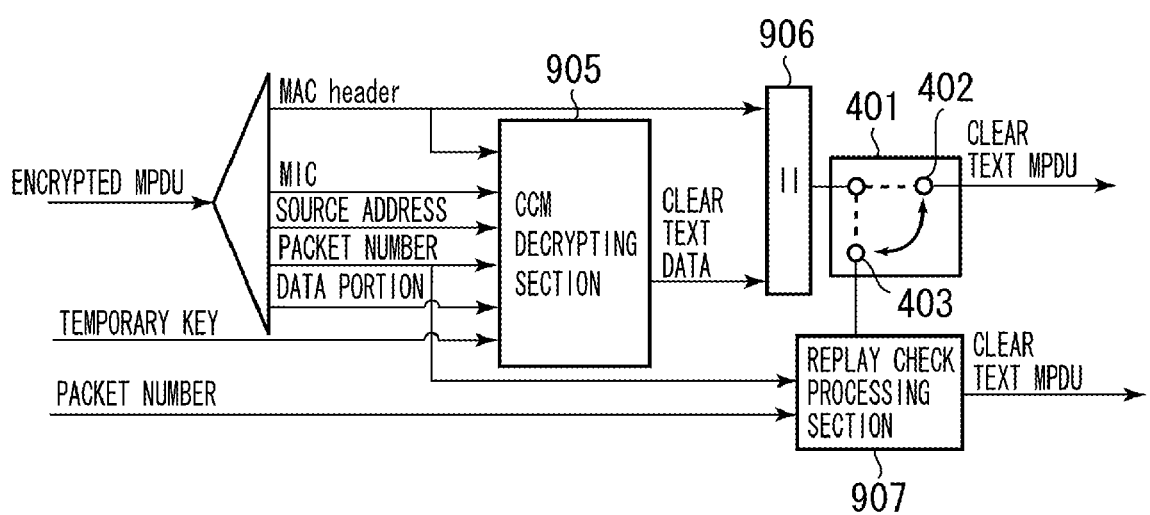
FIG. 4 is a block diagram illustrating an example CCMP decryption circuit according to an exemplary embodiment.

FIG. 4 is a block diagram illustrating an example CCMP decryption circuit according to the present exemplary embodiment. The wireless communication section 204 (or the RF section 205) of the DSC 101 and the wireless communication section 304 (or the RF section 305) of the printer 102 includes the CCMP decryption circuit shown in FIG. 4.

The CCMP decryption circuit shown in FIG. 4 is different from the decryption circuit shown in FIG. 9B in that a replay check control section 401 is additionally provided. The replay check control section 401, having a communication path switching function, can selectively transmit an output of the clear text MPDU assembling section 906 to an output terminal 402 or to a terminal 403.

When a switching terminal of the replay check control section 401 is connected to the terminal 403, the replay check processing section 907 executes "replay check" processing and detects alteration involved in the received data based on the packet number. When any alteration is detected, the replay check processing section 907 abandons the received data. When no alteration is found, the replay check processing section 907 decides that the received data is normal, and forwards the received data to a host application.

When the switching terminal of the replay check control section 401 is connected to the terminal 402, the clear text MPDU assembling section 906 can directly send its output (i.e., received data) to the host application without executing the "replay check" processing.

FIG. 5 shows example parameters for the wireless communications performed between the DSC 101 and the printer 102. The operating sections 210 and 310 enable users to set various parameters shown in FIG. 5. The parameters set by a user of the DSC 101 can be copied into a USB memory, and then the parameters of the USB memory can be copied into the printer 102.

Furthermore, an ad-hoc network can be constructed for the wireless communications between the DSC 101 and the printer 102, so that the wireless communication parameters can be automatically exchanged and determined.

The parameter table shown in FIG. 5 may includes numerous parameter items. For example, a "Network Mode" item designates the architecture of the wireless network selectable between the "infrastructure" mode and the "ad-hoc" mode, although the ad-hoc mode is designated according to the example shown in FIG. 5.

An "SSID" item represents a network identifier. A "CH Number" item designates a frequency channel to be used when the device constructs a network operable in the ad-hoc mode.

An "Authentication Type" item designates an authentication system when the device constructs a network operable in the infrastructure mode. For example, a user can select any one of Open System, Shared System, WPA (Wi-Fi Protected Access), or WPA-PSK (Wi-Fi Protected Access Pre-shared key). When the network is the ad-hoc mode, no selection is required for the "Authentication Type" item.

An "Encryption Type" item designates an encryption system employed in the wireless network. For example, WEP (40bit), WEP (104bit), TKIP, or CCMP can be selected or automatically determined in the wireless communication device as initial settings, or can be selected by a user. According to the example shown in FIG. 5, the selected encryption system is CCMP.

An "Encryption Key" item designates a key to be used in the encryption processing. The encryption key can be automatically produced by the wireless communication device, or can be directly input by a user. For example, the user can set a desirable encryption key consisting of 8 to 63 characters when the CCMP encryption system is selected.

Furthermore, the user can designate a total number of wireless communication devices constituting the network. In the exemplary embodiment, the communication devices constituting the wireless communication system are the DSC 101 and the printer 102. Therefore, a "Network Device Number" item designates two devices.

Considering the total number of wireless communication devices, each of the wireless communication sections 204 and 304 can determine whether the replay check processing section 907 should execute the "replay check" processing.

Figure 6:
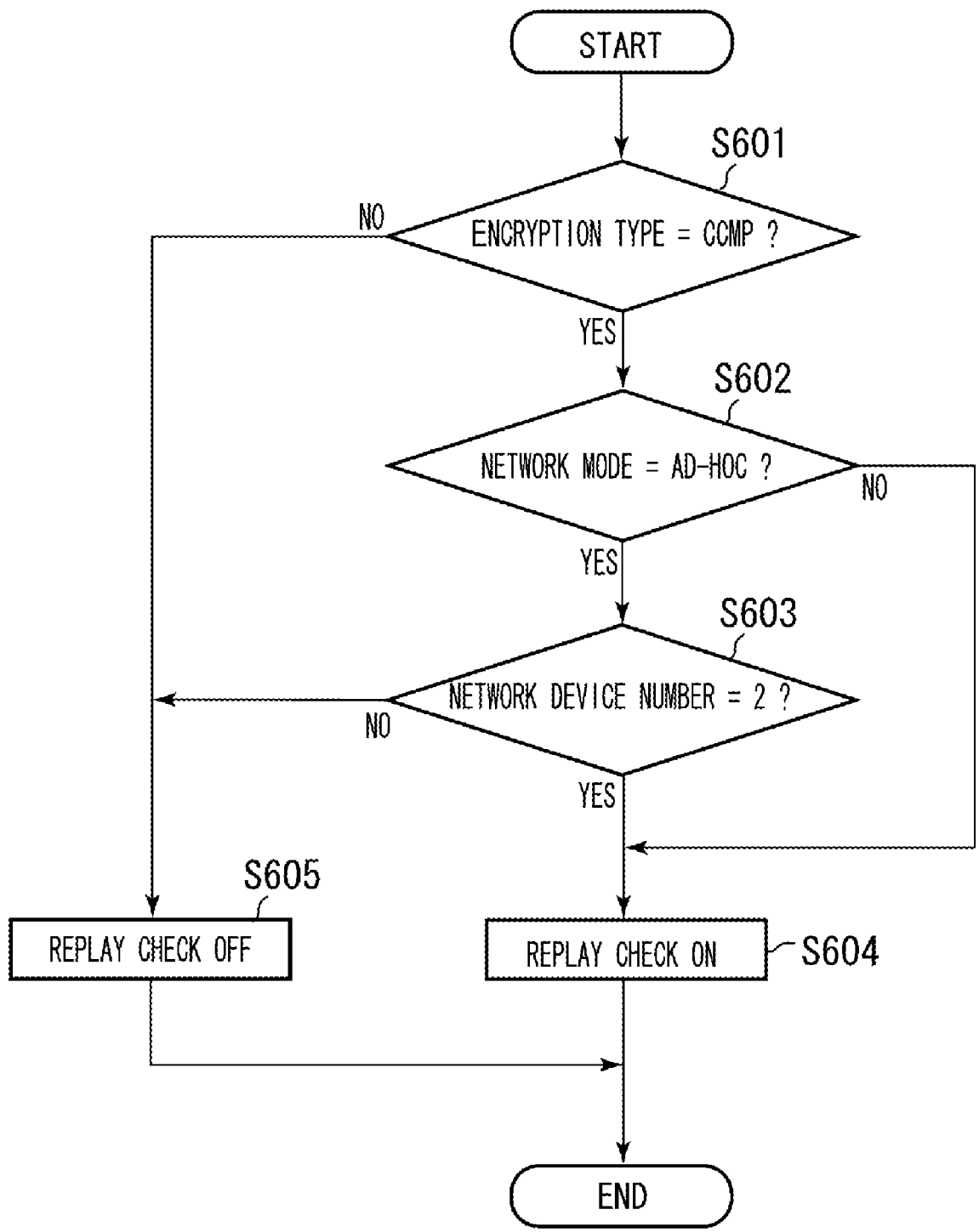
FIG. 6 is a flowchart showing an example replay check control performed by each wireless communication device in accordance with an exemplary embodiment.

FIG. 6 is a flowchart showing an example replay check control performed by the CPU 215 (315) according to the program stored in the ROM 216 (316) or the flash ROM 213 (313). Furthermore, the CPU 215 (315) can control the decryption circuit shown in FIG. 4 in the following manner. When the wireless communication section 204 (304) includes a control section, the control section can control the decryption circuit shown in FIG. 4. In the present exemplary embodiment, each of the CPU 215 and the CPU 315 executes the control shown in FIG. 6.

Now referring to FIG. 6, the CPU 215 (315) determines whether the encryption type set in the parameter table of FIG. 5 is CCMP (refer to step S601). When the encryption type is not CCMP, the processing flow proceeds to step S605. When the encryption type is CCMP, the processing flow proceeds to step S602.

In step S602, the CPU 215 (315) determines whether the network mode is the ad-hoc mode. When the network mode is not the ad-hoc mode (i.e., when the network mode is the infrastructure mode), the replay check control section 401 connects its switching terminal to the terminal 403 to execute the replay check processing. Namely, the output of the clear text MPDU assembling section 906 is sent to the replay check processing section 907 (refer to step S604).

When the network mode is the ad-hoc mode (i.e., YES in step S602), the processing flow proceeds to step S603. In step S603, the CPU 215 (315) determines whether the total number of the network devices is 2. When the total number of the network devices is 2, only one other communication device is present. It is unnecessary to administrate other communication device.

Thus, the replay check control section 401 connects the switching terminal to the terminal 403 to execute the replay check processing. Namely, the output of the clear text MPDU assembling section 906 is sent to the replay check processing section 907 (refer to step S604). In other words, when the total number of the network devices is 2, the replay check processing is constantly performed based on the packet number.

When the total number of the network devices is not 2, the processing flow proceeds to step S605. In step S605, the replay check control section 401 connects the switching terminal to terminal 402 to directly output the data produced from the clear text MPDU assembling section 906 without executing the replay check processing.

Figure 7:
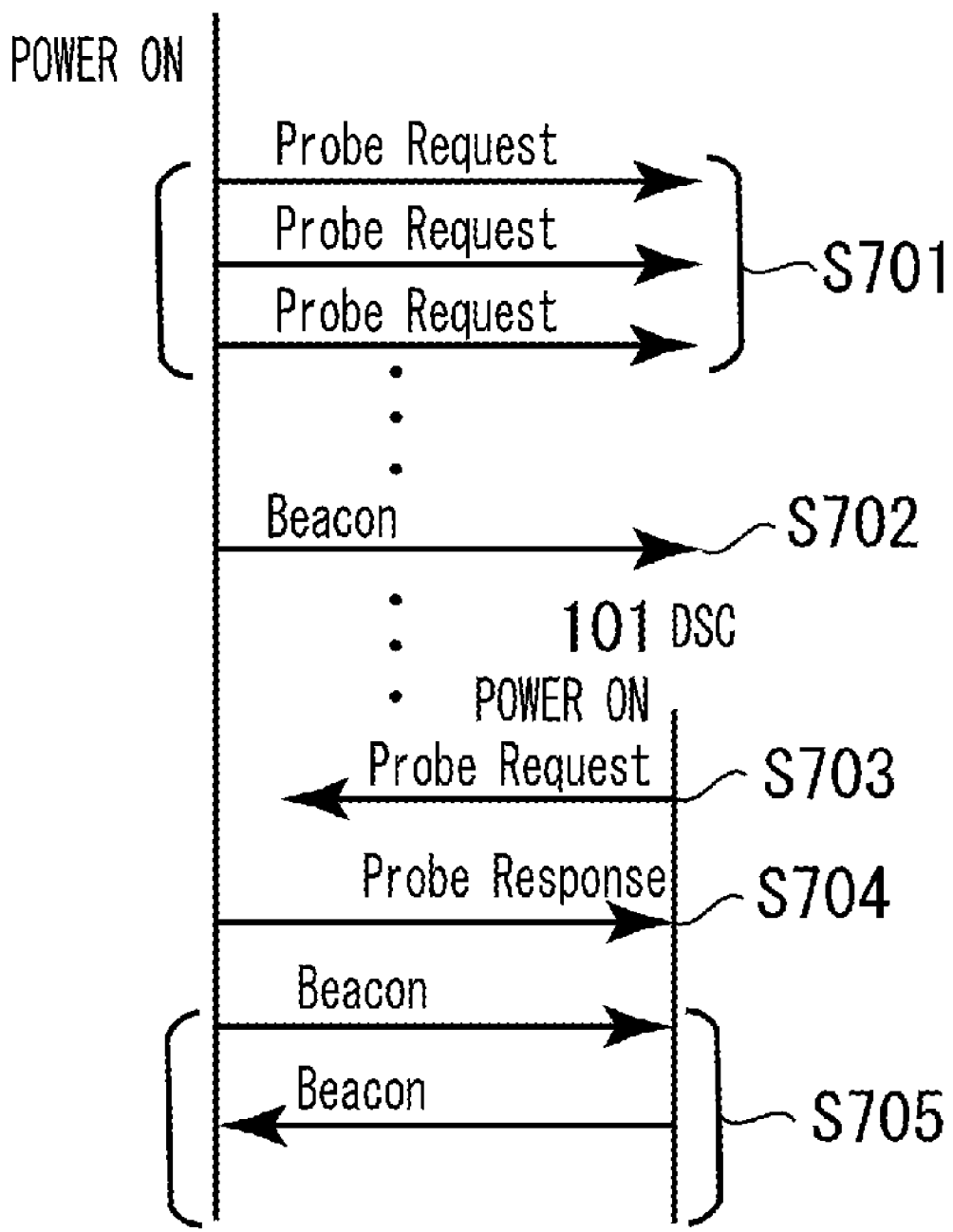
FIG. 7 is a diagram illustrating an example participation sequence in the ad-hoc network according to an aspect of the present invention.

An example method for connecting the wireless communication devices according to the ad-hoc mode (i.e., a direct communication mode using no relay station) will now be described with reference to FIG. 7.

Both of the DSC 101 and the printer 102 disclosed in FIG. 1 has the wireless communication function, according to which each communication device can alternately generate a random signal, generally referred to as "Beacon," notifying other wireless communication device(s) of the information required for the wireless communications so as to synchronize the operations in respective devices.

In the exemplary embodiment, wireless communication parameters set beforehand for the DSC 101 and the printer 102 are identical to each other. The following is a method for constructing an ad-hoc network for the wireless communication system shown in FIG. 1.

First, the printer 102 turns on a power source of the wireless communication section 304. Then, the printer 102 retrieves an ad-hoc network which is constructed based on ad-hoc mode wireless communication parameters determined beforehand. To this end, as one method, the printer 102 can retrieve the "Beacon." As another method, the printer 102 can broadcast a control signal (generally referred to as "Probe Request") and wait for a returning signal (generally referred to as "Probe Response"). The exemplary embodiment employs the latter method.

Namely, the printer 102 transmits the probe request (refer to S701) and waits for the probe response. In the exemplary embodiment, no other device is included in the ad-hoc network when retrieved by the printer 102. Therefore, the printer 102 can receive no probe response after transmitting a predetermined number of probe requests. Accordingly, the printer 102 constructs its own network and starts transmitting the "Beacon" (refer to S702).

Next, the DSC 101 turns on a power source of the wireless communication section. Similar to the printer 102, the DSC 101 transmits a "Probe Request" to retrieve an ad-hoc network which is constructed based on the ad-hoc mode wireless communication parameters determined beforehand (refer to S703) At this moment, the ad-hoc network retrieved by the DSC 101 is already constructed by the printer 102.

Accordingly, the printer 102 returns the probe response to the DSC 101. The DSC 101 receives the response (refer to S704). After receiving the probe response, the DSC 101 obtains sync information of the ad-hoc network constructed by the printer 102 and can participate in the ad-hoc network. Then, the printer 102 and the DSC 101 start transmitting and receiving the "Beacon" in the ad-hoc network (refer to S705).

The DSC 101, having participated in the ad-hoc network as described above, retrieves other device(s) constituting the ad-hoc network, and selects the printer 102 to instruct the print processing. The data in the wireless communications are encrypted according to the CCMP system (refer to FIG. 9A). In this case, the packet numbers are controlled as shown in FIG. 8.

Figure 8:
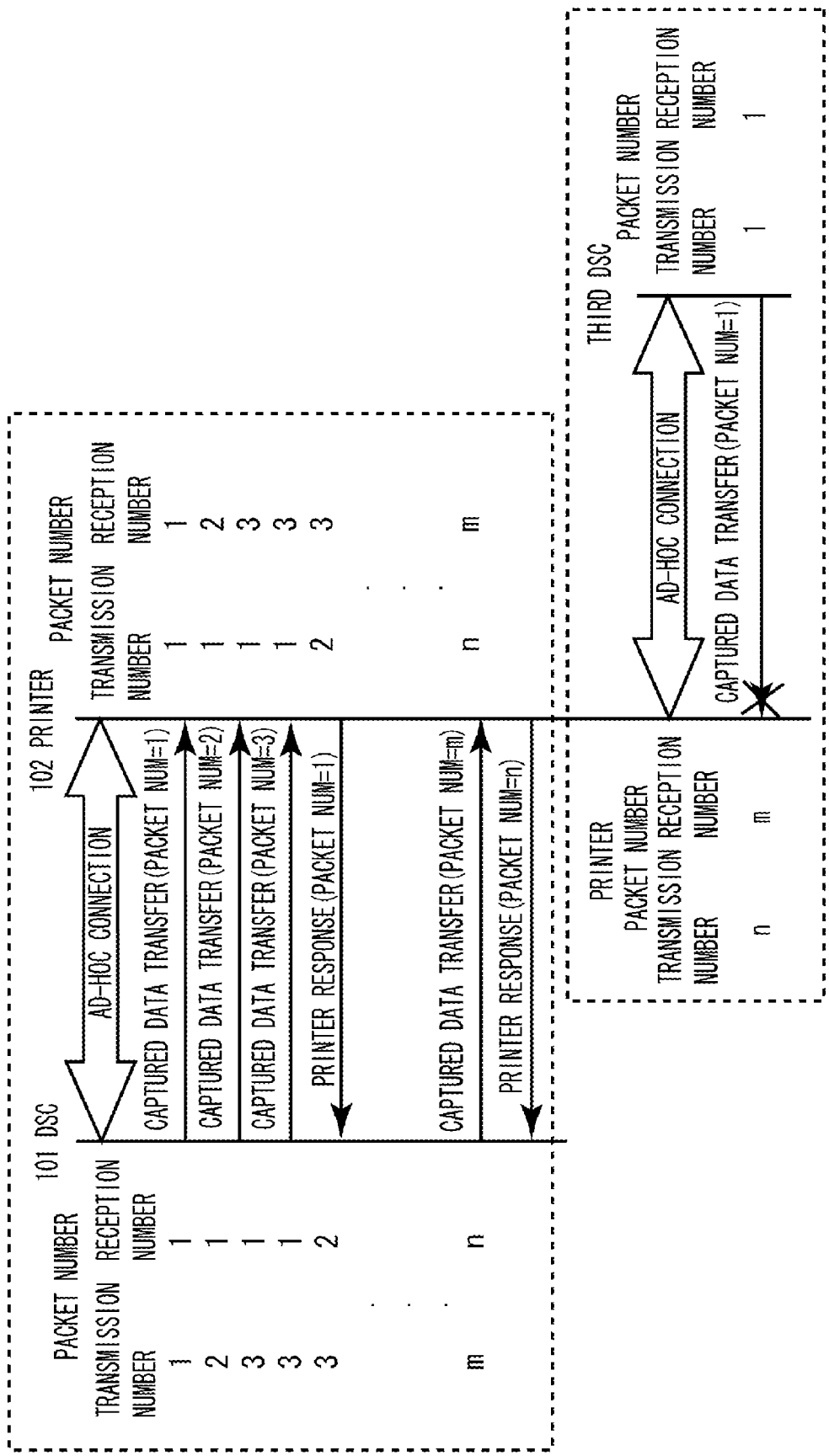
FIG. 8 is a diagram illustrating a packet number control according to the CCMP system according to an aspect of the present invention.

In each of the DSC 101 and the printer 102, the packet number includes two values which can be administrated as a "transmission number" of the packet and a "reception number" to be expected in the reception of the packet as shown in FIG. 8. The "transmission number" is incremented in response to each transmission of the packet transmitted to the other communication device. The "reception number" is incremented in response to each reception of the packet received from the other communication device.

In each of the DSC 101 and the printer 102, the packet number of the received data (refer to "Packet Num" shown in FIG. 8) is compared to the reception number administrated in each device (DSC 101, printer 102). As described with reference to FIG. 9B, alteration of the received packet is determined based on the comparison result.

In this case, as shown in FIG. 8, an unknown DSC having a third wireless communication function (not shown in FIG. 1) may transmit an altered packet resembling a correctly transmitted packet.

However, as understood from FIG. 8, the packet number involved in the transmission packet of the third apparatus is smaller than the packet numbers administrated by the DSC 101 and the printer 102.

Accordingly, when CCMP encrypted data is received from any unknown third apparatus, the DSC 101 and the printer 102 can perform the replay check processing to detect alteration involved in the packet and, as a result, can block any unauthorized access.

As described above, the present exemplary embodiment can easily realize the CCMP data communications in the ad-hoc mode without increasing the processing load in each wireless communication device.

Figure 10:
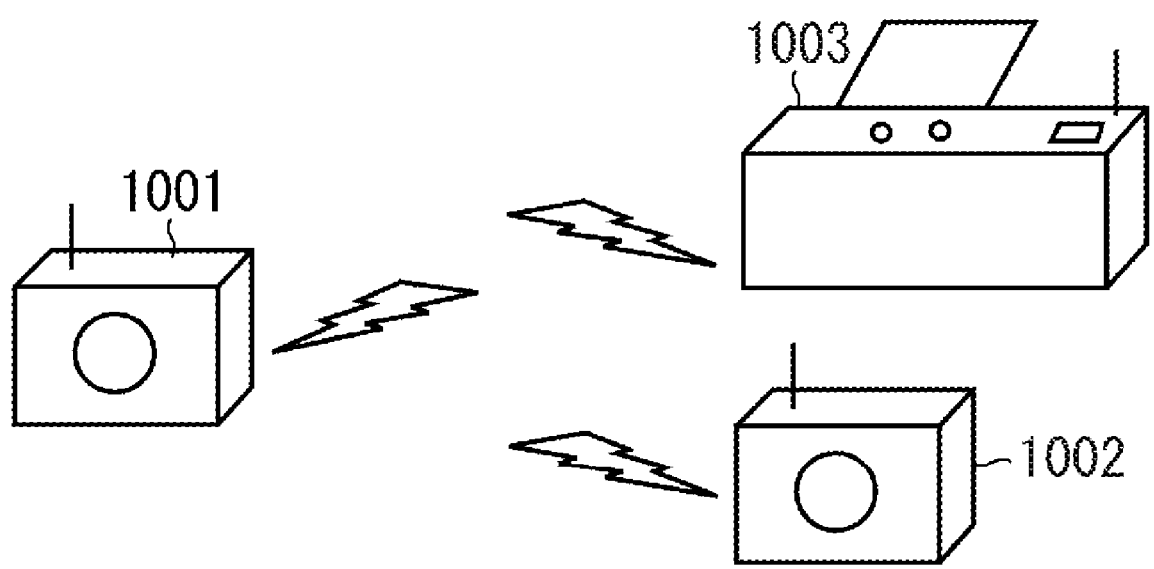
FIG. 10 is a schematic view illustrating an example wireless communication system including three wireless communication devices operable in the ad-hoc mode according to an aspect of the present invention.

FIG. 10 shows a wireless communication system including three wireless communication devices (i.e., DSC 1001, DSC 1002, and printer 1003) operable in the ad-hoc mode. Each of the DSC 1001 and the DSC 1002 has the arrangement shown in FIG. 2. The printer 1003 has the arrangement shown in FIG. 3.

In this case, the wireless communication parameters shown in FIG. 5 are similarly applied to each wireless communication device shown in FIG. 10, although the "Network Device Number" is rewritten to three devices.

According to the flowchart shown in FIG. 6, the decision result in step S603 is NO because the total number of the wireless communication devices is 3. Thus, in step S605, the replay check control section 401 connects the switching terminal to terminal 402 to directly output the data produced from the clear text MPDU assembling section 906 without executing the replay check processing based on the packet numbers.

Accordingly, when three or more communication devices constitute a wireless network operable in the ad-hoc mode, it is unnecessary to perform a complicated control for administrating packet numbers for other communication devices. The processing load of each wireless communication device can be reduced.

Furthermore, even in this case, the wireless communication devices can execute the encrypted communication according to the CCMP system. The security in the communications can be maintained at a high level. In particular, the encrypted communication according to the CCMP system is excellent in encryption intensity compared to the encrypted communication according to the WEP system. Therefore, the security level can be maintained regardless of execution of the replay check processing.

Figure 11:
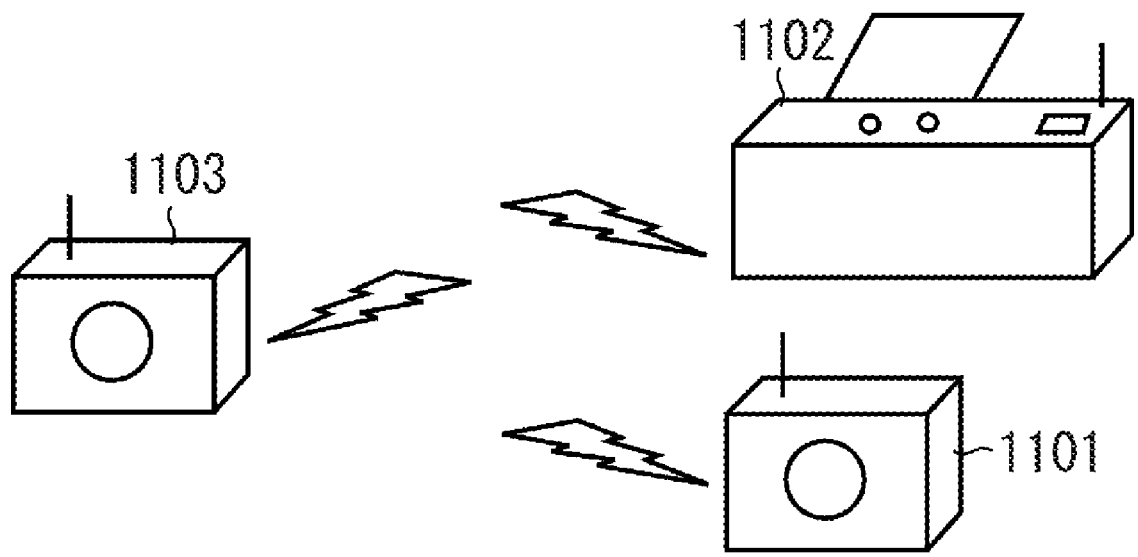
FIG. 11 is a schematic view illustrating another example wireless communication system including wireless communication devices operable in the infrastructure mode according to an aspect of the present invention.

Next, the wireless communications performed in the infrastructure mode will be described. FIG. 11 shows a wireless communication system including three wireless communication devices (i.e., DSC 1101, printer 1102, and AP 1103) operating in the infrastructure mode. The DSC 1101 has the arrangement shown in FIG. 2. The printer 1102 has the arrangement shown in FIG. 3.

The AP 1103 is a wireless access point capable of controlling wireless communications performed between the wireless communication devices according to the IEEE802.11 standard.

The wireless communication parameters of the DSC 1101 and the printer 1102 are dependent on the method for constructing the wireless network. As the network mode is the infrastructure mode, the item "Network Mode" in FIG. 5 is set to "Infrastructure." Furthermore, the "SSID", "Authentication Type", "Encryption Type", and "Encryption Key" items are set to the values identical to the setting values for the AP 1103.

According to the example of FIG. 11, the "Authentication Type" item is set to "WPA-PSK" and the "Encryption Type" item is set to "CCMP." As the "CH Number" item designates the operation channel used by the AP 1103 and the "Network Device Number" item designates a total number of the wireless communication devices administrated by the AP, no designation is necessary for these items.

According to the flowchart shown in FIG. 6, the decision result in step S602 is YES because the network mode is "Infrastructure."

Thus, in step S604, the replay check control section 401 connects the switching terminal to the terminal 403 to execute the replay check processing based on the packet numbers. When the network mode is "Infrastructure," each communication device is only required to administrate the packet number relative to the AP 1103.

To realize the wireless connection in the infrastructure mode, the wireless communication parameters set for the DSC 1101 are identical to the setting values for the AP 1103. The wireless communication parameters can be copied in the USB memory, and the parameters stored in the USB memory can be copied in the printer 1102. Alternatively, each device can construct a network with the AP 1103 for data exchange of wireless communication parameters.

When the network mode is "Infrastructure," each of the DSC 1101 and the printer 1102 can perform connection processing with the AP 1103 according to the protocol of the IEEE802.11 and IEE802.11i standards.

In this network, wireless communication devices can perform the encrypted communication according to the CCMP system, and also perform the decryption processing and the alteration detection according to the CCPM method.

In the above-described embodiment, the network device number is set by a user. However, it is possible to automatically discriminate the total number of wireless communication devices constituting the ad-hoc network and perform the control processing shown in FIG. 6.

In this case, each wireless communication device can discriminate the total number of the devices constituting the ad-hoc network by administrating the MAC address of a source involved in the Beacon received in the ad-hoc network.

As described above, regardless of the network architecture and the number of associated communication devices, each wireless communication device can perform the encrypted communication according to the CCMP system and can maintain higher security compared to the encrypted communication according to the WEP method.

Furthermore, when three or more wireless communication devices constitute a network operable in the ad-hoc mode, administrating all other communication devices constituting the network is unnecessary to perform the alteration detection.

Also, a complicated control for administrating packet numbers of respective communication devices is unnecessary. Accordingly, the processing load of each device can be decreased.

Additionally even in this case, the wireless communication devices can execute the encrypted communication according to the CCMP system. The security in the communications can be maintained adequately.

For example, the encrypted communication according to the CCMP system is excellent in encryption intensity compared to the encrypted communication according to the WEP method. Therefore, the security level can be maintained highly regardless of execution of the replay check processing.

The above-described exemplary embodiment can reduce the processing load in the wireless communications and can maintain higher security. For example, a wireless communication device can perform both the encrypted communication and the alteration detection when only one other communication device is present in the ad-hoc network. On the other hand, the wireless communication device can cancel the alteration detection and perform only the encrypted communication when two or more other communication devices are present in the ad-hoc network.

In this manner, the above-described exemplary embodiment can reduce the contents required for administrating other communication devices and therefore can reduce the processing load and can maintain higher security.

A software program code for realizing the functions of the above-described exemplary embodiments can be supplied, via a storage medium (or a recording medium), to a system or an apparatus. A computer (or CPU or MPU) in the system or the apparatus can read the program code stored in the storage medium and can execute the readout program.

In this case, the program code read out from the storage medium can realize the functions of the exemplary embodiments. The equivalents of programs can be used if they possess comparable functions. Accordingly, when the functions or processes of the exemplary embodiments are realized by a computer, program code installed in the computer and a recording medium storing the program are used to implement the present invention.

In other words, the present invention encompasses a computer program that can realize the functions or processes of the exemplary embodiments or any recording medium that can store the program. In this case, the type of the program can be any one of object code, interpreter program, and OS script data. A recording medium supplying the program can be selected from any one of a flexible disk, a hard disk, an optical disk, a magneto-optical disk, an MO, a CD-ROM, a CD-R, a CD-RW, a magnetic tape, a nonvolatile memory card, a ROM, and a DVD (DVD-ROM, DVD-R).

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Further, not only the functions of the above-described exemplary embodiment can be realized by a computer that executes the programs, but also an operating system (OS) running on the computer can execute part or all of the actual processing based on instructions of the programs.

Moreover, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-336005 filed Nov. 21, 2005, which is hereby incorporated by reference herein in its entirety.

What is claimed:

1. A communication apparatus, comprising:
   a computer processing unit including a processor configured to determine at least one of (1) whether an architecture of a network with which the communication apparatus communicates is a network on which the communication apparatus communicates with another apparatus via a base station or a network on which the communication apparatus directly communicates with the another apparatus, not via the base station, and (2) a number of apparatuses on the network; and
   a switching unit configured to switch between performing encrypted communication with a falsification detection processing and communication and performing communication without the falsification detection processing, based on the determination by the computer processing unit,
   wherein the switching unit is switched to perform encrypted communication with the falsification detection processing when it is determined that the architecture of the network provides for communication with another apparatus via the base station, the switching unit is switched to perform encrypted communication without the falsification detection processing when it is determined that the architecture of the network provides for communication with the another apparatus directly and a number of apparatuses on the network are greater than a threshold number of apparatuses on the network,
   wherein the communication apparatus has a function to perform falsification detection processing to determine whether a data packet received by the communication apparatus is falsified by comparing a packet number involved in the received data packet and a packet number administrated by the communication apparatus.

2. The communication apparatus according to claim 1, further comprising a decryption unit configured to decrypt received encrypted data packet based on packet number of the received encrypted data packet,
   wherein the data decrypted by the decryption unit is regarded as non-falsified data, depending on the determination by the computer processing unit.

3. The communication apparatus according to claim 1, wherein the computer processing unit determines whether the architecture of the network is an infrastructure network or an ad-hoc network.

4. The communication apparatus according to claim 1, wherein the switching unit is controlled to perform encrypted communication without the falsification detection processing when the number of communication apparatuses on the network is 3 or more.

5. The communication apparatus according to claim 1, wherein the switching unit is controlled to perform encrypted communication without the falsification detection processing when the architecture of the network is a network on which the communication apparatus directly communicates with the other apparatus without the base station and the number of communication apparatuses on the network is 3 or more.

6. The communication apparatus according to claim 1, wherein the switching unit is controlled to perform encrypted communication with the falsification detection processing regardless of the number of the communication apparatuses on the network when the architecture of the network is a network on which the communication apparatus communicates with the other apparatus via a base station.

7. A method performed by a communication apparatus, the method comprising:
   determining at least one of (1) whether an architecture of a network with which the communication apparatus communicates is a network on which the communication apparatus communicates with another apparatus via a base station or a network on which the communication apparatus directly communicates with the another apparatus, not via the base station, and (2) a number of apparatuses on the network; and
   controlling a switching unit to perform encrypted communication with a falsification detection processing based on the determination by a computer processing unit of the communication apparatus,
   wherein the switching unit is switched to perform encrypted communication with the falsification detection processing when it is determined that the architecture of the network provides for communication with another apparatus via the base station, the switching unit is switched to perform encrypted communication without the falsification detection processing when it is determined that the architecture of the network provides for communication with the another apparatus directly and a number of apparatuses on the network are greater than a threshold number of apparatuses on the network,
   wherein the switching unit is configured to switch between performing encrypted communication with falsification detection processing and performing encrypted communication without the falsification detection processing,
   wherein the falsification detection processing is a processing for determining whether a data packet received by the communication apparatus is falsified by comparing a packet number involved in the received data packet and a packet number administrated by the communication apparatus.

8. The method according to claim 7, further comprising decrypting received encrypted data based on packet number of the received encrypted data packet,
   wherein the data decrypted is regarded as non-falsified data, depending on the determination.

9. The method according to claim 7, wherein it is determined whether the architecture of the network is an infrastructure network or ad-hoc network.

10. The method according to claim 7, wherein the switching unit is controlled to perform encrypted communication without the falsification detection processing when the number of the communication apparatuses on the network is 3 or more.

11. The method according to claim 7, wherein the switching unit is controlled to perform encrypted communication without the falsification detection processing when the architecture of the network is a network on which the communication apparatus directly communicates with the other apparatus without the base station and the number of the communication apparatuses on the network is 3 or more.

12. The method according to claim 7, wherein the switching unit is controlled to perform encrypted communication with the falsification detection processing regardless of the number of the communication apparatuses on the network when the architecture of the network is a network on which the communication apparatus communicates with the another apparatus via a base station.

13. A non-transitory computer readable medium containing computer-executable instructions to be performed by a communication apparatus, the medium comprising:
   computer-executable instructions for determining at least one of (1) whether an architecture of a network with which the communication apparatus communicates is a network on which the communication apparatus communicates with another apparatus via a base station or a network on which the communication apparatus directly communicates with the another apparatus without via the base station, and (2) a number of apparatuses on the network; and
   computer-executable instructions for controlling a switching unit to perform encrypted communication with a falsification detection processing based on the determination by a computer processing unit of the communication apparatus,
   wherein the switching unit is switched to perform encrypted communication with the falsification detection processing when it is determined that the architecture of the network provides for communication with another apparatus via the base station, the switching unit is switched to perform encrypted communication without the falsification detection processing when it is determined that the architecture of the network provides for communication with the another apparatus directly and a number of apparatuses on the network are greater than a threshold number of apparatuses on the network,
   wherein the switching unit is configured to switch between performing encrypted communication with falsification detection processing and performing encrypted communication without the falsification detection processing,
   wherein the falsification detection processing is a processing for determining whether a data packet received by the communication apparatus is falsified by comparing a packet number involved in the received data packet and a packet number administrated by the communication apparatus.

14. A communication apparatus, comprising:
   a computer processing unit including a processor configured to determine whether a network which the communication apparatus communicates is a network on which a communication partner is one apparatus or a network on which the communication partner is a plurality of apparatuses; and
   a switching unit configured to switch between performing encrypted communication with a falsification detection processing and performing encrypted communication without the falsification detection processing,
   wherein the switching unit is controlled to perform encrypted communication with the falsification detection processing, when it is determined that the network which the communication apparatus communicates is a network on which the communication partner is one apparatus, the switching unit is switched to perform encrypted communication without the falsification detection processing when it is determined that the architecture of the network provides for communication with the one apparatus directly and a number of apparatuses on the network are greater than a threshold number of apparatuses on the network,
   wherein the communication apparatus has a function to perform falsification detection processing to determine whether a data packet received by the communication apparatus is falsified by comparing a packet number involved in the received data packet and a packet number administrated by the communication apparatus.

15. The communication apparatus according to claim 14, wherein the switching unit is controlled to perform encrypted communication without the falsification detection processing when it is determined that the network which the communication apparatus communicates is a network on which the communication partner is a plurality of apparatuses.

16. A method performed by a communication apparatus, the method comprising:
   determining whether a network which the communication apparatus communicates is a network on which a communication partner is one apparatus or a network on which the communication partner is a plurality of apparatuses; and
   controlling a switching unit to perform encrypted communication with a falsification detection processing based on the determination that the network which the communication apparatus communicates is a network on which the communication partner is one apparatus,
   wherein the switching unit is switched to perform encrypted communication with the falsification detection processing when it is determined that an architecture of the network provides for communication with the one apparatus via a base station, the switching unit is switched to perform encrypted communication without the falsification detection processing when it is determined that the architecture of the network provides for communication with the one apparatus directly and a number of apparatuses on the network are greater than a threshold number of apparatuses on the network,
   wherein the switching unit is configured to switch between performing encrypted communication with falsification detection processing and performing encrypted communication without the falsification detection processing,
   wherein the falsification detection processing is a processing for determining whether a data packet received by the communication apparatus is falsified by comparing a packet number involved in the received data packet and a packet number administrated by the communication apparatus.

17. A non-transitory computer readable medium containing computer-executable instructions to be performed by a communication apparatus, comprising:
   computer-executable instructions for determining whether a network which the communication apparatus communicates is a network on which a communication partner is one apparatus or a network on which the communication partner is a plurality of apparatuses; and computer-executable instructions for controlling a switching unit to perform encrypted communication with a falsification detection processing based on the determination that the network which the communication apparatus communicates is a network on which the communication partner is one apparatus, wherein the switching unit is switched to perform encrypted communication with the falsification detection processing when it is determined that an architecture of the network provides for communication with one apparatus via a base station, the switching unit is switched to perform encrypted communication without the falsification detection processing when it is determined that the architecture of the network provides for communication with the one apparatus directly and a number of apparatuses on the network are greater than a threshold number of apparatuses on the network, wherein the switching unit is configured to switch between performing encrypted communication with falsification detection processing and performing encrypted communication without the falsification detection processing, wherein the falsification detection processing is a processing for determining whether a data packet received by the communication apparatus is falsified by comparing a packet number involved in the received data packet and a packet number administrated by the communication apparatus.

* * * * *